United States Patent
Pauer et al.

(10) Patent No.: US 7,222,529 B2
(45) Date of Patent: May 29, 2007

(54) FILLING LEVEL SENSOR FOR A FUEL TANK OF A MOTOR VEHICLE

(75) Inventors: Bernd Pauer, Eppstein (DE); Bernd Rumpf, Nidderau (DE)

(73) Assignee: Siemens Aktiengesellschaft, Munich (DE)

( * ) Notice: Subject to any disclaimer, the term of this patent is extended or adjusted under 35 U.S.C. 154(b) by 87 days.

(21) Appl. No.: 10/792,590

(22) Filed: Mar. 3, 2004

(65) Prior Publication Data

US 2004/0226366 A1    Nov. 18, 2004

(30) Foreign Application Priority Data

Feb. 28, 2003   (DE) ................. 103 08 957

(51) Int. Cl.
  *G01F 23/00*   (2006.01)
  *G01F 23/30*   (2006.01)
(52) U.S. Cl. .................. 73/313; 116/227; 73/314
(58) Field of Classification Search ........... 73/313, 73/314, 317, 305; 340/623, 450, 625, 624; 116/227–229; 33/719
See application file for complete search history.

(56) References Cited

U.S. PATENT DOCUMENTS

| | | | | |
|---|---|---|---|---|
| 3,102,990 A * | 9/1963 | Miller et al. | ................ | 338/162 |
| 4,278,725 A | 7/1981 | Riley et al. | ................ | 428/208 |
| 5,341,119 A | 8/1994 | Berlin et al. | ................ | 338/224 |
| 5,346,720 A * | 9/1994 | Lombard et al. | ........... | 427/101 |
| 5,366,813 A | 11/1994 | Berlin | ........................ | 428/546 |
| 5,746,088 A * | 5/1998 | Sawert et al. | ................. | 73/317 |
| 6,021,668 A * | 2/2000 | Sawert et al. | ................. | 73/313 |
| 6,389,892 B1 * | 5/2002 | Sato et al. | ..................... | 73/317 |
| 6,404,331 B1 * | 6/2002 | Huttinger et al. | ........... | 340/450 |
| 6,518,873 B1 * | 2/2003 | O'Regan et al. | ............ | 338/190 |
| 6,571,627 B2 * | 6/2003 | Yasuda et al. | ................. | 73/317 |
| 6,681,628 B2 * | 1/2004 | Sawert et al. | ................. | 73/317 |
| 2002/0040597 A1 * | 4/2002 | Sawert et al. | ................. | 73/317 |
| 2004/0007062 A1 * | 1/2004 | Ireland et al. | ................ | 73/313 |

FOREIGN PATENT DOCUMENTS

| | | |
|---|---|---|
| DE | 693 00 503 T2 | 2/1996 |
| DE | 299 12 523 U1 | 12/1999 |
| DE | 100 49 373 A1 | 5/2001 |
| DE | 100 37 014 A1 | 2/2002 |
| DE | 101 52 029 A1 | 7/2002 |
| EP | 0 789 231 A2 | 8/1997 |
| EP | 1 061 345 A1 | 12/2000 |
| JP | 04206602 | 7/1992 |

* cited by examiner

*Primary Examiner*—Hezron Williams
*Assistant Examiner*—Tamiko Bellamt
(74) *Attorney, Agent, or Firm*—Mayer, Brown, Rowe & Maw LLP

(57) ABSTRACT

The invention relates to a filling level sensor for a fuel tank with a float which is fastened to a lever arm and at least one contact which is arranged on the lever arm and is in connection with a slider track formed as a thick-film resistor. The thick-film resistor consists of at least two precious metals, one precious metal being silver and present in a smaller proportion than the other precious metal.

4 Claims, 1 Drawing Sheet

FILLING LEVEL SENSOR FOR A FUEL TANK OF A MOTOR VEHICLE

BACKGROUND OF THE INVENTION

The subject matter of the invention is a filling level sensor with a float which is fastened to a lever arm and at least one contact which is arranged on the lever arm and is in connection with a slider track formed as a thick-film resistor.

Such filling level sensors for a fuel tank of a motor vehicle have long been the known state of the art. The thick film is in this case applied to a substrate, which is often a ceramic. The actual thick film comprises one or more metals. It is known to use silver for this, on account of its good conductivity and corrosion resistance. When such a thick-film resistor is used in a filling level sensor in a fuel tank, it has been found that, in spite of its good corrosion resistance, silver is attacked by fuels. In particular, some aggressive constituents in certain fuels react with silver in such a way as to cause deposits on the surface of the thick-film resistor over the operating time of the filling level sensor. These deposits are characterized by a changed conductivity. As a consequence, the deposits lead to changes in the measured resistance values that are contrary to the actual conditions in the fuel tank. The filling level sensor consequently no longer operates accurately, or in the worst case the filling level sensor fails.

It is also known to use gold or platinum as a material in thick-film resistors to avoid this disadvantage. Such thick-film resistors do indeed have a higher corrosion resistance. Apart from the higher costs for these materials, the adhesive strength of such thick films is inadequate. Moreover, thick films of gold or platinum have a poor soldering behavior. In order nevertheless to achieve adequate contact stability, they have disproportionately large soldering areas for the terminal contacts. This configuration with the associated high costs has previously been accepted, and regarded as the technical optimum.

The present invention is based on the object of providing a filling level sensor with a thick-film resistor which has a high corrosion resistance with respect to fuels and ensures good adhesive strength on a substrate.

BRIEF DESCRIPTION OF THE INVENTION

The object is achieved by the features of claim 1. Advantageous configurations are described in the subclaims.

The filling level sensor according to the invention comprises a float which is fastened to a lever arm and at least one contact which is arranged on the lever arm and is in connection with a slider track formed as a thick-film resistor, the thick-film resistor comprising at least two precious metals, one of the precious metals being silver and present in a smaller proportion than the other precious metal or metals.

It has been found that even a small proportion of silver improves the solubility of other materials of the thick film. The greater solubility leads to improved adhesive strength of the thick film on the substrate. Furthermore, there is a denser distribution on the ceramic carrier and a more homogeneous surface of the thick film. Consequently, the use of silver allows the use of gold and/or platinum as main constituents of the thick film, with the associated outstanding properties with regard to electrical conductivity and corrosion resistance. The small proportion of silver also achieves the effect that virtually no silver is present in the surface of the thick film, whereby parasitic deposits with changed resistance values are avoided. The filling level sensor is therefore distinguished by particularly great operational reliability over the entire service life of the filling level sensor. Consequently, the filling level sensor according to the invention is at the same time suitable for use in aggressive fuels.

A proportion of silver in the thick film of 0.1% to 10% has proven to be particularly advantageous, it being possible for the proportion of silver to be chosen according to use in the fuel being used. In particular in the case of aggressive constituents in the fuel, for example ethanol, the proportion of silver is chosen to be low. For instance, with a proportion of 1% silver, good adhesion resistance and good soldering behavior are achieved, whereas no deposits are observed on the surface of the thick-film resistor.

BRIEF DESCRIPTION OF THE DRAWING

The FIGURE is a side elevation of a fuel level sensor for use in a fuel tank showing the location of the thick film of this invention.

The invention is explained in more detail on the basis of an exemplary embodiment.

DETAILED DESCRIPTION OF THE INVENTION

Figure 1:
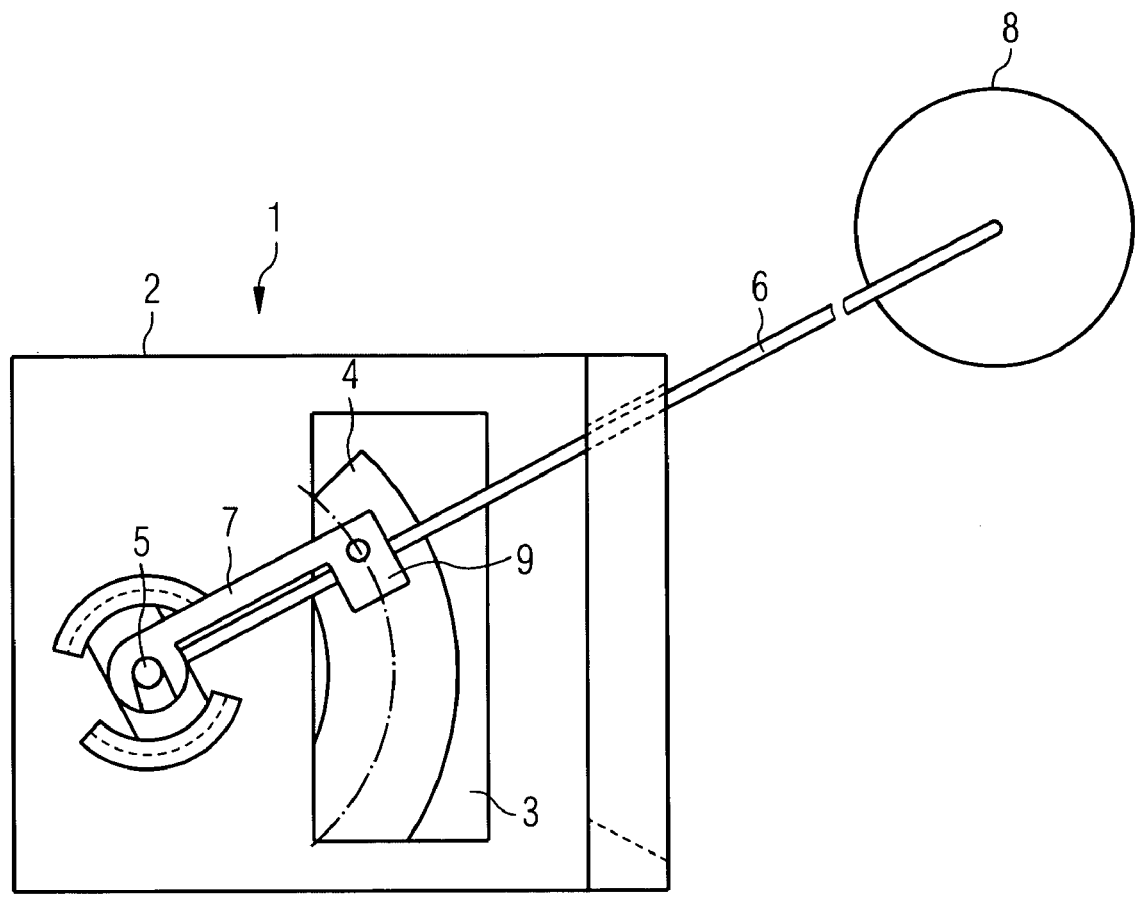

The single FIGURE shows a filling level sensor 1 for use in a fuel tank. Arranged on a carrier 2 is a substrate 3 consisting of ceramic, which comprises a thick film 4 formed as a resistor network. A lever arm 6 is pivotably mounted on the carrier 2 in a bore 5 by means of a bracket 7. A float 8 is arranged at the other end of the lever arm 6. Located on the bracket 7 is a contact 9, which is in connection with the thick film 4, which takes the form of a slider track. According to the filling level in the fuel tank, the float 8 is deflected. The contact 9 is moved over the thick film 4 by an amount corresponding to the deflection by the float 8. The measured resistance value is fed via connection lines to an evaluation unit (not represented). The thick film 4 consists of the precious metals gold, platinum and silver, which are embedded in a glass matrix. The proportion of silver can range from 0.1 to 10.0%, but preferably from 0.5 to 5% and more preferably in an amount of 1.0%.

The invention claimed is:

1. A filling level sensor for a fuel tank with a float which is fastened to a lever arm and at least one contact which is arranged on the lever arm and is in connection with a slider track formed as a single layer thick-film resistor bonded to and supported on a ceramic substrate, the thick-film resistor being an alloy compositionally consisting of at least two precious metals, characterized in that one precious metal is silver that is present in a proportion of 0.5 to 5.0% effective to improve the adhesion of the alloy thick film layer to the substrate.

2. The filling level sensor as claimed in claim 1, characterized in that gold, platinum and/or palladium are present in the single layer thick film (4) as further precious metals.

3. The filling level sensor as claimed in claim 1, characterized in that silver is contained in that silver is contained in the thick film (4) in a proportion of 1%.

4. A filling level sensor for a fuel tank with a float which fastened to a lever arm and at least one contact which is arranged on the lever arm and is in connection with a slider track formed as a single layer thick-film resistor, the thick film compositionally consisting of from about 0.1 to 5% silver effective to improve the adhesion of the alloy thick film layer to the substrate, and the remainder or the composition consisting of at least one metal selected from the group consisting of gold, platinum and palladium.

* * * * *